United States Patent

Suozzo

[15] 3,637,176
[45] Jan. 25, 1972

[54] THERMOMECHANICAL MULTIFUNCTION SUPPORT DEVICE

[72] Inventor: Leonard S. Suozzo, 366 Maple Hill Drive, Hackensack, N.J. 07601

[22] Filed: Aug. 17, 1970

[21] Appl. No.: 64,321

Related U.S. Application Data

[63] Continuation-in-part of Ser. No. 807,048, Mar. 13, 1969.

[52] U.S. Cl. ........................................... 248/59, 248/54 CS
[51] Int. Cl. ............................................................. F16l 3/20
[58] Field of Search ........................... 248/54 R, 54 CS, 58, 59

[56] References Cited

UNITED STATES PATENTS

| | | | |
|---|---|---|---|
| 2,905,415 | 9/1959 | Sundahl | 248/54 R |
| 2,945,656 | 7/1960 | Sherburne | 248/58 |
| 3,115,753 | 12/1963 | Sherburne | 248/58 X |
| 3,112,909 | 12/1963 | Suozzo | 248/58 |

*Primary Examiner*—Chancellor E. Harris
*Attorney*—F. J. Pisarra

[57] ABSTRACT

A device for use with piping or other equipment that is subject to changes in position due to variations in its thermal condition. The device comprises actuating means, which is secured to the piping at spaced first and second locations and is movable relative to the piping in response and in direct proportion to expansion or contraction resulting from said variations in thermal condition, and coupling means. The actuating means includes a rigid member connected at one end to the piping at the first location and a ball screw and nut unit connected to the piping at the second location and connected to the other end of the rigid member. The coupling means is variable in effective length and is connected at one end to the ball screw and nut unit and at its other end to a stationary support. The coupling means includes gearing which is cooperatively associated with the ball screw and nut unit. The parts are so constructed and arranged that increments of movement of the actuating means cause corresponding variations in the effective length of the coupling means.

16 Claims, 3 Drawing Figures

INVENTOR.
LEONARD S. SUOZZO
BY F. J. Pisarra
Attorney

THERMOMECHANICAL MULTIFUNCTION SUPPORT DEVICE

This application is a continuation-in-part of my pending patent application Ser. No. 807,048, filed Mar. 13, 1969.

BACKGROUND OF THE INVENTION

This invention relates in general to a device for properly and effectively supporting and/or controlling movement of piping or other equipment that is subject to changes in position due to variations in its thermal condition.

As in the case of the support device of my said pending application, the subject device is multifunctional in that it may beneficially serve in a wide variety of capacities, depending on specific applications, and may be advantageously employed, by way of example, as:

1. A shock and sway arrestor;
2. A springless constant support;
3. An assist to known spring supports to render them truly constant; and/or
4. A positioner for piping.

SUMMARY OF THE INVENTION

The device of this invention is intended for use with piping or other equipment that is subject to changes in position due to variations in thermal condition.

The device comprises two basic means, namely actuating means, adapted to be secured to the piping at spaced first and second locations and to move relative to the piping in response and in direct proportion to said variations in thermal condition, and coupling means connected to the actuating means and adapted to be connected to a stationary support. The actuating means includes a rigid member, which is adapted to be pivotally connected to the piping at said first location, and a motion converting mechanism, such as a ball screw and nut unit, which is connected to the rigid member and is adapted to be connected to the piping at said second location. The coupling means is adjustable in length and is connected at one end to the motion converting mechanism and is adapted to be connected at its other end to a stationary support. The coupling means includes gearing which is cooperatively associated with the motion converting mechanism.

The objects of this invention include those enumerated in my said pending application Ser. No. 807,048.

This invention has for a further object the provision of a device of the character indicated having its parts so constructed and arranged that increments of movement of the actuating means corresponding, but greatly increased, changes in the effective length of the coupling means.

The objects and advantages of the invention will be apparent and manifest to persons trained in the art from the ensuing detailed description and the accompanying drawings which describe and illustrate several preferred embodiments of the invention.

BRIEF DESCRIPTION OF THE DRAWINGS.

In the drawings wherein like reference numerals denote corresponding parts in the several views.

DESCRIPTION OF THE PREFERRED EMBODIMENTS

Figure 1:
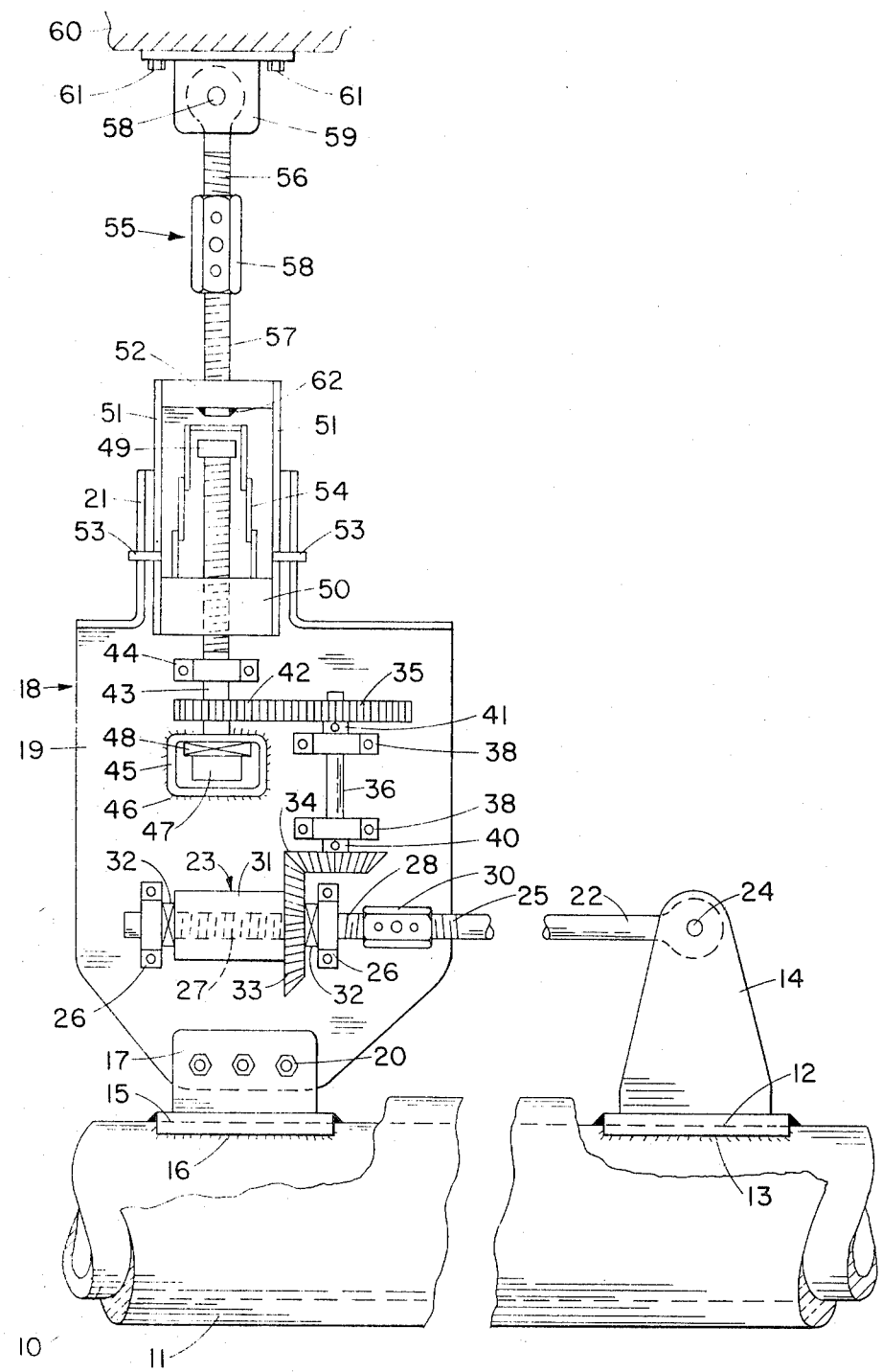
FIG. 1 is a view in side elevation of a device of this invention cooperatively associated with piping.

Referring initially to FIG. 1 of the drawings, the therein illustrated embodiment of the invention is shown in operative association with a section of piping 10 which is encased in a suitable heat insulating sheath 11. For the purposes of this disclosure, it is assumed that piping section 10 is part of a piping system employed in a high temperature power plant. It is not uncommon in modern power plants to utilize piping systems to transmit steam at temperatures in excess of 1,000° F. and at pressures greater than 1,500 pounds per square inch. Such systems require adequate support to allow and compensate for movement of the piping due to normal expansion and contraction of the metal thereof.

The device of FIG. 1 includes a bracket 12 that is secured at a first location to piping section 10 by a weldment 13. The bracket has a pair of upstanding parallel arms 14, only one of which is shown. A second bracket 15 is secured to the piping section at a second location, spaced from bracket 12, by a like weldment 16. This bracket also has a pair of upstanding parallel arms 17, only one of which is shown.

A housing unit 18 includes a rear wall 19 that is attached to bracket arms 17 by bolts 20. The housing unit also includes side and front walls (not shown) and is provided at the top with a tubular, upwardly projecting extension, a portion of which is indicated at 21.

The device also includes actuating means that is comprised of a rigid member 22 and a mechanism 23. Rigid member 22 is connected at one end to bracket arms 14 by a pivot pin 24 and is threaded at its other end, as indicated at 25.

Mechanism 23 is mounted on housing wall 19 and serves the function of converting rectilinear motion of rigid member 22 into rotary motion of parts that will be described further along herein. This mechanism comprises a pair of spaced bearings 26 which are mounted on housing wall 19 and a screw member 27 which is journaled for rotation in bearings 26. One end of the screw member is threaded for engagement by a sleeve-type turnbuckle 30. The turnbuckle also engages threaded end portion 25 of the rigid member and serves to adjust the combined length of rigid member 22 and screw member 27, as required at the time of installation. Mechanism 23 also comprises a nut member 31 which is operatively associated with screw member 27. The mechanism is equipped with a pair of thrust bearings 32 which are positioned between bearings 26 and corresponding ends of nut member 31. Mechanism 23 is a low friction unit and is preferably a ball screw and nut unit for the type manufactured by Beaver Precision Products, Inc. of Troy, Mich.

Mounted on and rotatable with nut unit 31 is a bevel gear 33 which cooperates with a gearing system that will now be described. The gearing system includes a bevel gear 34, which meshes with bevel gear 33 and a spur gear 35. Gears 34 and 35 are mounted at opposite ends of a shaft 36 which is journaled for rotation in bearings 38.

Shaft 36 is equipped with a pair of collars 40 and 41 which prevent axial movement of this shaft and its gears in use. Gear 35 meshes with a pinion 42 that is rotatable with a screw member 43. This screw member is supported for rotation in a bearing 44. The lower end of screw member 43 extends through a wall of a casing 45 which is welded to housing wall 19 as indicated at 46. Positioned within the casing is a block 47 that is also welded to the housing wall and serves as a bottom support for the screw member. A thrust bearing is interposed between the lower end of the screw member and block 47. The screw member is equipped at its upper end with a travel stop 49 and is operatively associated with a nut member 50. Screw member 43 and nut member 50 constitute elements of a second motion converting mechanism.

Secured to the sides of nut member 50, preferably by welding, is a pair of oppositely disposed, upwardly projecting, arcuate members 51. A plate 52 is positioned between and welded to the upper ends of member 51. Members 51 carry a pair of oppositely projecting, lateral pins 53 which register with corresponding vertical slots (not shown) in portion 21 of the tubular extension. These pins serve the dual functions of indicating vertical travel of the piping section and preventing rotational movement of nut member 50 relative to screw member 43 while permitting movement of the nut member along the screw member. Nut member 50, members 51 and plate 52 are in the nature of a "cage." A telescopic cover 54 is mounted on nut member 50 and protectively envelopes the upper portion of screw member 43.

The device further includes connector means, generally indicated by numeral 55, which comprises a pair of rods 56 and 57 that are threaded, as shown, and are interconnected by a turnbuckle 58 for adjusting the effective length at the time of installation. Rod 56 is pivotally connected by a pin 58 to a bracket 59 which is anchored to a stationary overhead support, such as a beam 60, by bolts or the like 61. As shown, rod 56 extends through the center of plate 52 and is secured thereto by a weldment 62.

For the purpose of outlining the operation of the above-described embodiment of the invention, it is assumed that the device has been installed and that the parts are in the relative position shown in FIG. 1. It will be evident that piping 10 is being directly supported by the device. It is also assumed that the piping system is initially in "cold condition," the temperature of the piping being substantially the same as that of the ambient atmosphere, for example, 70° F.

When the piping system is placed in active service, steam generated by the power plant is transmitted therethrough and the temperature of the piping is gradually increased to a maximum predetermined level, for example, 1,070° F. As a consequence of this temperature increase, the piping system is caused to expand or elongate and its position is changed. The elongation of the portion of piping 10 between bracket plates 14 and 17, due to the temperature increase, actuates the inventive device, whereby screw member 27 moves toward the right (FIG. 1) to an extent that is directly proportional to such elongation. Due to the interconnection of screw member 27 and coupling means 55, through the medium of nut member 13, gears 33, 34, 35 and 42, screw member 43, nut member 50, members 51 and plate 52, the piping is lowered a distance corresponding to the movement of rigid member 22 and screw member 27. It will be manifest that the distance the pipe is lowered is a multiple of the movement of the actuating means. Such multiple depends on the design of the particular motion converting mechanisms and the ratios of the several intermeshing gears. The parts are so designed and arranged that such distance is the same as the calculated or actual distance the piping would normally move due to temperature increase from "cold condition" to "hot condition." Thus, the device both supports the piping and causes it to move to its calculated or actual normal position due to variations in the temperature of the piping.

At such time as the power plant is shut down, the temperature of the piping gradually reduces from 1,070° F. to the ambient temperature of about 70° F. and the piping contracts. Such contraction of the piping causes the device to operate in a reverse manner, thereby causing the piping to assume its calculated or normal position at all times during cooling.

Figure 2:
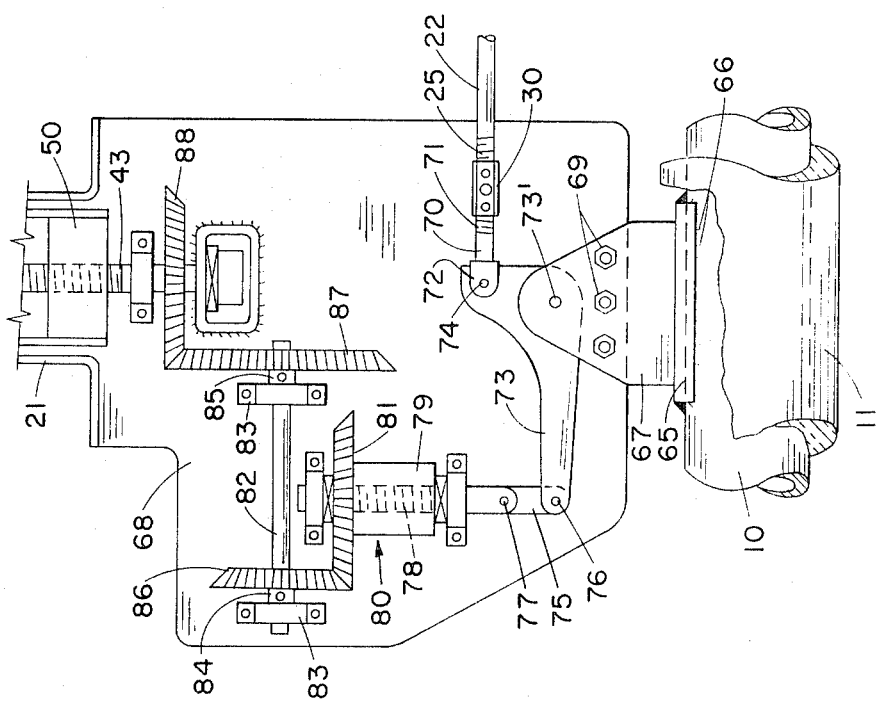
FIG. 2 is a view corresponding to a portion of FIG. 1 and illustrates a first modified form of the invention.

Reference is next had to FIG. 2 for an understanding of the construction of the modification of the invention shown therein. This modification includes parts (not shown) which are the same as the parts in the right-hand portion and in the upper portion of FIG. 1. The device of FIG. 2 comprises a bracket 65 which is welded to piping 10, as indicated at 66, and which includes a pair of upstanding parallel arms 67. Bracket 65 corresponds to bracket 15 of FIG. 1. A housing rear wall 68, corresponding to wall 19 of FIG. 1, is anchored to bracket arms 67 by bolts 69.

The actuating means of FIG. 2 includes earlier described rigid member 22 and an extension 70 which has a threaded end portion 71 for connection to turnbuckle 30 and which has a clevis at its free end. The actuating means also includes a bell crank 73 which is pivoted to the bracket arms by a pin 73'. The bell crank is connected at one end to clevis 72 by a pivot pin 74 and its other end to the lower portion of a link 75 by a pivot pin 76. The upper end of the link is connected by a pivot pin 77 to the lower end of a screw member 78. The screw member is cooperatively associated with a nut member 79. These parts are elements of a mechanism 80 for converting rectilinear motion of the screw member into rotary motion of the nut member. Mechanism 80 is preferably the same as mechanism 23 of FIG. 1.

A bevel gear 81 is secured to and rotatable with nut member 79 and coacts with a gearing system which is similar to that of FIG. 1. The gearing system comprises a shaft 82 that is mounted for rotation in bearings 83 and that is provided with collars 84 and 85 to prevent axial movement. Shaft 82 carries a pair of bevel gears 86 and 87, the latter meshing with a bevel gear 88 that is affixed to and rotatable with screw member 43.

Figure 3:
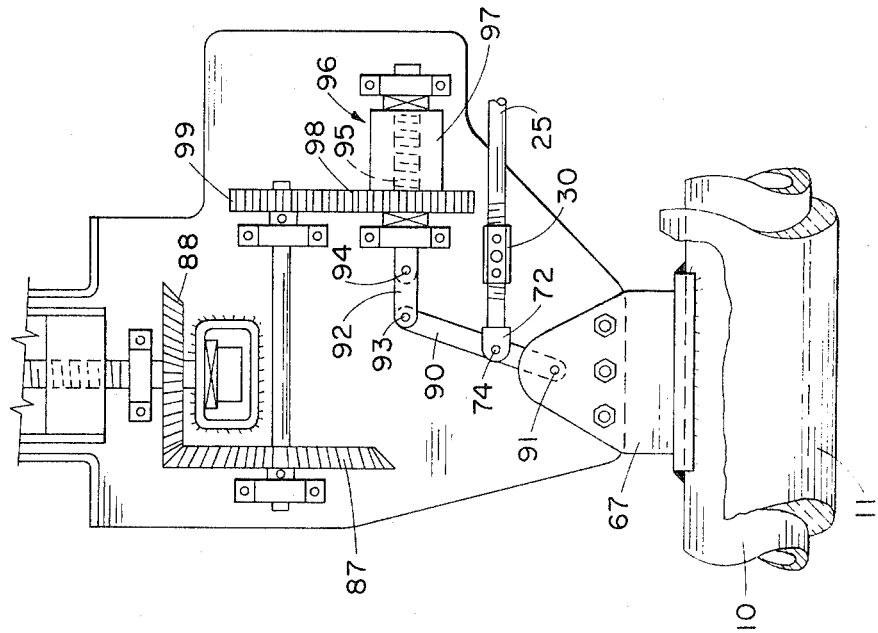
FIG. 3 is a view corresponding to FIG. 2 and illustrates another modified form of the invention.

The modification of the invention shown in FIG. 3 includes a number of parts which are the same as or similar to corresponding parts embodied in the constructions illustrated in FIGS. 1 and 2. The construction of FIG. 3 utilizes a link 90 in place of bell crank 73 of FIG. 2. Link 90 is pivoted at its lower end to bracket arms 67 by a pin 91 and its upper end to a link 92 by a pin 93. Link 92 is, in turn, connected by a pivot pin 94 to an end of a screw member 95. This screw member is an element of a motion converting mechanism 96 which is essentially the same as the earlier described motion converting mechanisms. The motion converting mechanism also includes a nut member 97 which carries a spur gear 98. This gear meshes with a pinion 99. The remaining parts of the device of FIG. 3 are the same as those shown in other views.

The forms of the invention depicted in FIGS. 2 and 3 operate in the same general manner as that shown in FIG. 1 as will be evident from an examination thereof.

Based on the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interposed as illustrative only and not in a limiting sense.

I claim:

1. A device for use with equipment, such as piping, that is subject to changes in position resulting from expansion or contraction due to variations in its thermal condition comprising:
    a. actuating means adapted to be secured to the piping at spaced first and second locations and to move relative to the piping as the piping expands or contracts in response and in direct proportion to said variations in thermal condition, said actuating means including:
       1. a rigid member adapted to be connected at one end to the piping at said first location and move along a generally rectilinear path in use; and
       2. a mechanism for converting such movement of the rigid member into rotary motion, said mechanism being adapted to be secured to the piping at said second location; and
    b. coupling means operably connected to the actuating means and adapted to be connected to a stationary support, said coupling means including:
       1. a connector means adapted to be connected to a stationary support; and
       2. gearing interposed between and coacting with the mechanism and the connector means.

2. A device according to claim 1 wherein the mechanism comprises:
    a. a screw member connected to the other end of the rigid member;
    b. a nut member operatively associated with the screw member; and
    c. a gear carried by and rotatable with the nut member and engaging the gearing.

3. A device according to claim 2 wherein the screw member is connected directly to the rigid member and moves along the path of movement thereof in use.

4. A device according to claim 2 wherein the actuating means also includes:
    a. a lever adapted to be pivotally connected to the piping at said second location, said lever being pivotally connected to the other end of the rigid member and to the screw member at spaced points.

5. A device according to claim 4 wherein the lever comprises:
   a bell crank which is pivotally connected at one end to the rigid member and at its other end to the screw member.

6. A device according to claim 5 wherein the path of movement of the screw member is generally normal to that of the rigid member.

7. A device according to claim 4 wherein the lever is adapted to be pivotally connected at one end to the piping at said second location, is pivotally connected at its other end to the screw member and is pivotally connected intermediate its ends to the rigid member.

8. A device according to claim 5 wherein the path of movement of the screw member is generally parallel to that of the rigid member.

9. A device for use with equipment, such as piping, that is subject to changes in position resulting from expansion or contraction due to variations in its thermal condition comprising:
   a. actuating means adapted to be secured to the piping at spaced first and second locations and to move relative to the piping as the piping expands or contracts in response and in direct proportion to said variations in thermal condition, said actuating means including:
      1. a rigid member adapted to be connected at one end to the piping at said first location and move along a generally rectilinear path in use; and
      2. a first mechanism for converting such movement of the rigid member into rotary motion, said mechanism being adapted to be secured to the piping at said second location; and
   b. coupling means operably connected to the actuating means and adapted to be connected to a stationary support, said coupling means including:
      1. connector means;
      2. gearing interposed between and coacting with the first mechanism and the connector means; and
      3. a second mechanism for converting rotary movement of the gearing into lineal movement relative to the connector means.

10. A device according to claim 9 wherein the first mechanism comprises:
    a. a first screw member connected to the other end of the rigid member;
    b. a first nut member operatively associated with the screw member; and
    c. a first gear carried by and rotatable with the nut member and engaging the gearing; and
    wherein the second mechanism comprises:
    a. a second screw member connected to gearing;
    b. a second nut member operatively associated with the second screw member and connected to the connector member; and
    c. a second gear carried by and rotatable with the second screw member and engaging the gearing.

11. A device according to claim 10 wherein the first screw member is connected directly to the rigid member and moves along the path of movement thereof in use.

12. A device according to claim 10 wherein the actuating means also includes:
    a. a lever adapted to be pivotally connected to the piping at said second location, said lever being pivotally connected to the other end of the rigid member and to the first screw member at spaced points.

13. A device according to claim 12 wherein the lever comprises:
    a. a bell crank which is pivotally connected at one end to the rigid member and at its other end to the first screw member.

14. A device according to claim 13 wherein the path of movement of the first screw member is generally normal to that of the rigid member.

15. A device according to claim 12 wherein the lever is adapted to be pivotally connected at one end to the piping at said second location, is pivotally connected at its other end to the first screw member and is pivotally connected intermediate its ends to the rigid member.

16. A device according to claim 15 wherein the path of movement of the first screw member is generally parallel to that of the rigid member.

* * * * *